United States Patent [19]

Smith et al.

[11] Patent Number: 5,691,689

[45] Date of Patent: Nov. 25, 1997

[54] ELECTRICAL CIRCUIT PROTECTION DEVICES COMPRISING PTC CONDUCTIVE LIQUID CRYSTAL POLYMER COMPOSITIONS

[75] Inventors: James D. B. Smith, Monroeville; Karl F. Schoch, Jr., Pittsburgh, both of Pa.; Selami Y. Pusatcioglu, Mequon; Xiaoyun Shirley Lai, BrownDeer, both of Wis.

[73] Assignee: Eaton Corporation, Cleveland, Ohio

[21] Appl. No.: 514,201

[22] Filed: Aug. 11, 1995

[51] Int. Cl.$^6$ ................................................ H01C 7/10
[52] U.S. Cl. .................................. 338/22 R; 338/22 BD
[58] Field of Search ........................ 338/225 SD, 22 R; 219/504; 252/511

[56] References Cited

U.S. PATENT DOCUMENTS

| | | | |
|---|---|---|---|
| 3,225,320 | 12/1965 | Solomons | 338/22 R |
| 3,243,753 | 3/1966 | Kohler | 338/22 R |
| 4,545,926 | 10/1985 | Fouts, Jr. et al. | 252/511 |
| 4,647,894 | 3/1987 | Ratell | 338/22 R |
| 4,685,025 | 8/1987 | Carlomagno | 361/106 |
| 4,724,417 | 2/1988 | Au et al. | 338/22 R |
| 4,772,422 | 9/1988 | Hijikata et al. | |
| 4,774,024 | 9/1988 | Deep et al. | 252/511 |
| 4,775,778 | 10/1988 | van Kouynenberg et al. | 219/549 |
| 4,857,880 | 8/1989 | Au et al. | 338/22 R |
| 4,910,389 | 3/1990 | Sherman et al. | 219/549 |
| 4,966,729 | 10/1990 | Carmona et al. | |
| 5,049,850 | 9/1991 | Evans | 338/22 R |
| 5,195,013 | 3/1993 | Jacobs et al. | 361/106 |
| 5,316,973 | 5/1994 | Wang et al. | 437/188 |
| 5,374,379 | 12/1994 | Tsubokawa et al. | |
| 5,428,100 | 6/1995 | Asai et al. | 524/496 |
| 5,529,741 | 6/1996 | Rubin et al. | 264/435 |

FOREIGN PATENT DOCUMENTS 2163566  6/1985  United Kingdom ................... 338/15

Primary Examiner—Teresa J. Walberg
Assistant Examiner—Karl Easthom
Attorney, Agent, or Firm—Martin J. Moran

[57] ABSTRACT

Electrical circuit protection devices containing PTC elements comprised of conductive polymers which exhibit PTC behavior and are used to protect a load in an electrical circuit, in which the PTC conductive polymers are based on highly crystalline and highly ordered liquid crystal polymers and particulate conductive fillers dispersed therein, which are cross-linked by radiation. These circuit protection devices operate as automatically resettable current limiters and are particularly useful for protecting motors, solenoids, telephone lines and batteries, and for enhancing circuit interruption capability when used in conjunction with breakers and contactors. The liquid crystal polymers include aromatic polyesters, e.g., poly(p-phenylene terephthalate) and poly(p-hydroxybenzoate); aromatic copolyesters, e.g., poly(p-hydroxybenzoate-co-2,6-hydroxynaphthoate), poly(deca-methyleneterephthaloyl di-p-hydroxybenzoate, and poly(ethylene terephthalate-co-oxybenzoate); aromatic copolyester amides, e.g., poly(2,6-hydroxy-naphoate-phenoxyaminoterephthoate); aromatic polyamides, e.g., poly(p-phenylene terephthalamide), Kevlar, poly(p-benzamide), poly(2-chloro-1,4-phenylene terephthalamide), poly(p,p'-biphenylamide), and poly(2,6-napthalamide); aromaticpolyazomethines, e.g., poly (nitro-2-methyl-1,4-phenylenenitriloethylidene-1,4-phenylenethylidine), poly(nitrilo-2-methyl-1,4-phenylenenitrilomethylidine-1,4-phenylenemethylidine), and poly(nitrolo-2-chloro-1,4-phenylenenitrilomethylidine-1,4-phenylenemethylidine); and, blends thereof. The particulate conductive fillers include carbon black, carbon fibers, graphite, and metal flakes.

14 Claims, 2 Drawing Sheets

5,691,689

ELECTRICAL CIRCUIT PROTECTION DEVICES COMPRISING PTC CONDUCTIVE LIQUID CRYSTAL POLYMER COMPOSITIONS

1. FIELD OF THE INVENTION

The invention relates to the field of electrical circuit protection devices, and in particular to electrical circuit protection devices comprising a PTC element composed of a PTC conductive polymer composition. The invention also relates to the field of electrically conductive PTC polymer compositions which are characterized by being in a relatively low resistance state which readily conduct a current therethrough under steady-state conditions, but which exhibit what is known as PTC behavior (positive temperature coefficient of resistance), i.e., rapidly transform into a relatively high resistance state due to self-heating of the PTC polymer above a switching temperature to limit current conduction therethrough to a safe value when subject to overcurrent conditions. Further, upon dissipation of the overcurrent conditions, the PTC polymer compositions cool and automatically revert back to the low resistance state to resume current conduction therethrough. This invention has application as an automatically resettable fuse or current limiter for overcurrent protection.

2. BACKGROUND OF THE INVENTION

Conductive polymer compositions which exhibit positive temperature coefficient of resistance (PTC) behavior, and electrical devices comprising PTC conductive polymer compositions have been widely used. The PTC conductive polymer compositions generally include conductive particles, such as carbon black, graphite or metal particles, dispersed in a polymer matrix, such as crystalline or non-crystalline thermoplastic polymer, elastomeric polymer or thermosetting polymer. PTC behavior in a conductive polymer composition is characterized by the material undergoing a sharp increase in resistivity as its temperature rises above a particular value otherwise known as the anomaly or switching temperature, $T_s$. At normal temperatures the conductive particles form chains in the polymer matrix to create a polymer composite with high electrical conductivity. Typically the initial resistivity of the PTC conductive polymer is from about 25 to 100,000 ohm-cm at temperatures below the switching temperature, $T_s$, the lower limit being based on the requirement that at temperatures above $T_s$, the PTC material should be an insulator and the upper limit being based on the requirement that at temperatures below $T_s$, the PTC material should be a conductor. Materials exhibiting PTC behavior are useful in a number of applications including electrical circuit protection devices in which the size of the current passing through a circuit is controlled by the temperature of a PTC element forming part of that circuit.

Particularly useful devices comprising PTC conductive polymers are electrical circuit protection devices. Such circuit protection devices usually contain a PTC element comprised of two electrodes embedded in a PTC conductive polymer. When connected to a circuit, the circuit protection devices have a relatively low resistance under normal operating conditions of the circuit, but are tripped, that is, converted into a high resistance state when a fault condition, for example, excessive current or temperature, occurs. When the circuit protection device is tripped by excessive current, the current passing through the PTC element causes it to self-heat to its transition temperature or switching temperature, $T_s$, at which a rapid increase in its resistance takes place, to transform it to a high resistance state. The switching temperature, $T_s$, can be related to the glass transition temperature, $T_g$, or crystalline melting temperature, $T_m$, of the conductive polymer.

The increase in resistance is accompanied by an expansion of the PTC element along an axis of expansion as the temperature rises through the polymer glass transition temperature ($T_g$). The resistance of the PTC element continues to increase as the temperature rises above $T_s$, until it reaches a maximum resistance at its peak resistance temperature, and the resistance thereafter decreases more or less rapidly. After the excessive current is cleared, the PTC element thermal cycles and self-cools to revert to its low resistance state where the conductive particles recombine to restore conductive paths to resume current conduction.

Representative electrical circuit protection devices and PTC conductive polymer compositions for use in the devices are described for example in U.S. Pat. Nos. 4,545,926 (Fouts, Jr., et al.), 4,647,894 (Ratell), 4,685,025 (Carlomagno), 4,724,417 (Au, et al.), 4,774,024 (Deep, et al.), 4,775,778 (van Konynenburg, et al.), 4,857,880 (Au, et al.), 4,910,389 (Sherman, et al.), 5,049,850 (Evans), and 5,195,013 (Jacobs, et al.).

In many electrical devices, and especially in circuit protection devices, the PTC conductive polymer compositions are frequently cross-linked, for example, by radiation, which is generally preferred, or by chemical cross-linking, in order to improve the physical and/or electrical properties of the compositions exhibiting PTC behavior. Cross-linking can be used to ensure that the resistivity of the composition remains at a high level as the temperature of the composition is increased above its switching temperature. Through cross-linking of the PTC conductive polymer, the desired resistance/temperature characteristics can be prepared. Cross-linking a PTC polymer generally increases its resistivity as well as its electrical properties. For details of cross-linking of PTC conductive polymers, reference should be made to, for example, U.S. Pat. Nos. 4,724,417 (Au et al.), 4,775,778 (van Konynenburg, et al.), and 5,195,013 (Jacobs, et al.).

In U.S. Pat. No. 4,775,778 (van Konyenburg, et al.), it was discovered that non-crystalline and crystalline polymers (which already show pronounced PTC behavior due to the crystallinity of the polymer) that are characterized by a rapid increase in resistance over a narrow temperature range from glass transition temperature (softening) to crystalline melting point, such as thermoplastic, elastomeric or thermosetting polymers having carbon black particles dispersed therein, can be cross-linked by radiation or chemicals to either establish PTC behavior or improve existing PTC behavior, as well as improve the structural properties of the PTC polymer.

In U.S. Pat. No. 4,724,417 (Au, et al.), an electrical circuit protection device is prepared from PTC conductive polymers comprising a polymeric component and a particulate conductive filler which is cross-linked in two steps and heated between the steps to a temperature above the glass transition temperature (softening temperature) of the polymer and preferably above the crystalline melting temperature, in order to improve the electrical properties of the PTC conductive polymer, especially for the ability to withstand high voltage current of about 600 volts.

In U.S. Pat. No. 5,195,013 (Jacobs, et al.), radiation cross-linking of PTC conductive polymers such as crystalline thermoplastic polymers having carbon black dispersed therein, at radiation dosages of at least 50 Megarads (Mrads), preferably between 120 to 600 Mrads, is shown to improve the ability of the PTC polymer to withstand a substantial number of thermal cycles from its low resistance state to a high resistance state (induced by resistive heating) and back again.

It would be desirable to provide electrical circuit protection devices containing PTC conductive polymer compositions which are based on conductive particles dispersed in highly crystalline and highly ordered polymeric components which can be cross-linked and which exhibit excellent PTC behavior.

What is needed is PTC conductive polymer compositions and electrical circuit protection devices comprising PTC conductive polymer compositions which are based on liquid crystal polymers.

3. SUMMARY OF THE INVENTION

We have now discovered that PTC conductive polymers based on liquid crystal polymers or cross-linked liquid crystal polymers have useful PTC behavior, and can be used in electrical devices, such as circuit protection devices, to improve the electrical and physical properties of the PTC element in the device.

It is an object of the invention to provide electrical devices such as circuit protection devices comprising a PTC element based on intrinsically highly crystalline liquid crystal polymers.

It is an object of the invention to provide PTC conductive polymer compositions based on intrinsically highly crystalline liquid crystal polymers.

It is a feature of the invention to provide a PTC conductive polymer with more controlled switching during tripping.

It is a feature of the invention to provide a PTC conductive polymer with more resistance to damage from radiation during cross-linking.

In one aspect, the invention resides in PTC conductive polymer compositions which comprise: (1) conductive filler particles dispersed in a (2) polymer matrix, where the polymer matrix comprises a liquid crystalline polymer, which is preferably cross-linked with radiation, to provide a PTC composition which has many technical advantages over the current state of the art. In these PTC conductive polymer compositions, the polymer matrix of liquid crystalline polymers can include one or more liquid crystalline polymers. The liquid crystalline polymers are preferably melt processable thermotropic liquid crystalline polymers. These liquid crystalline polymers are characterized by having a high degree of crystallinity in its mesomorphic state which intrinsically imparts a high degree of PTC behavior upon dispersal of conductive filler particulates therein. Preferably the liquid crystalline polymers are comprised of aromatic polyesters such as an aromatic copolyester, e.g., poly(p-hydroxybenzoate-co-2,6-hydroxynaphthoate) which can be formed as the condensation (transesterification) product of hydroxybenzoic acid and hydroxynaphthoic acid, or an aromatic polyester amide such as an aromatic copolyester amide, e.g., poly(2,6-hydroxynapthoate-phenoxyaminoterephthoate) which can be formed as the condensation (transesterification) product of hydroxynaphthoic acid, terephthalic acid, and 4'-hydroxyacetanilide. Other liquid crystalline polymers can also be used as described hereinbelow. Further in this PTC conductive polymer composition, the conductive filler particles incorporated into the polymeric matrix can include carbon black, graphite, metal powders, metal salts and conductive metal oxides. This PTC conductive polymer composition can also include non-conductive fillers such as flame retardants, arc-suppression agents, radiation cross-linking agents, plasticizers, antioxidants, and other adjuvants. These PTC conductive polymer compositions can further be cross-linked by radiation for improved electrical properties.

In another aspect, the invention resides in electrical devices, in particular circuit protection devices, which comprise generally two electrodes in contact with and electrically connected to a PTC element comprising a liquid crystalline polymer, preferably cross-linked, having particulate conductive filler dispersed therein and preferably having sufficient cross-links to provide the desired PTC effects. This device is electrically connectable to a circuit with a load and a source of electric power to cause current to pass through the PTC element during normal conditions. But when an excessive current is passed through the PTC element, it causes the PTC element to self-heat to a switching temperature, $T_s$, and expand along an axis of expansion, thereby rapidly increasing the resistance of the PTC element and limiting the current passing through the PTC element to a safe value. Once the fault current is cleared, the PTC element self-cools and automatically reverts back to its low resistance state.

4. BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the spirit and scope of the appended claims. In the drawings, FIG. 1 is a front cross-sectional view of a circuit protection device of the invention in which two parallel electrodes connectable to an electric circuit are embedded in a PTC element which is based on a liquid crystalline polymer and conductive particles dispersed therein;

5. DETAILED DESCRIPTION OF THE PREFERRED EMBODIMENTS OF THE INVENTION

Figure 1:
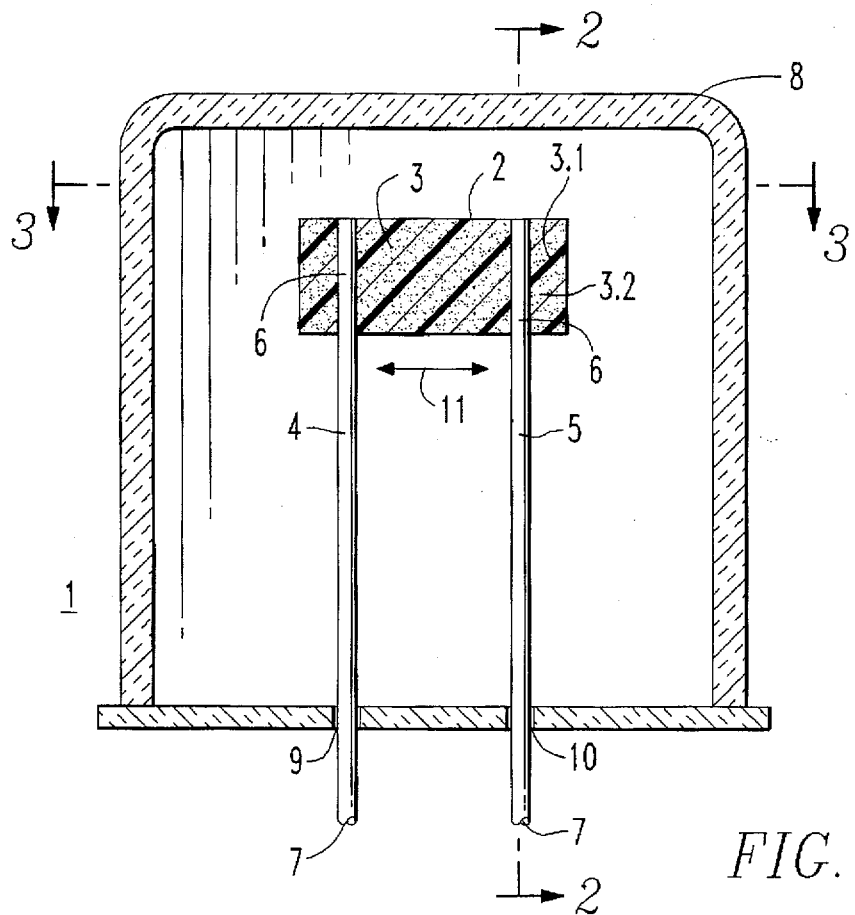

The novel PTC liquid crystalline polymer compositions of this invention exhibit PTC behavior. In general, the PTC behavior of these compositions can be characterized by being relatively conductive when used as a circuit component carrying normal current but which exhibit a very sharp increase in resistivity and reversibly transform into being relatively non-conductive when the temperature of these compositions increase above a switching temperature or switching temperature range, $T_s$, due to resistive heating ($I^2R$) generated from a fault current. The PTC liquid crystalline polymer compositions of the invention are particularly useful as a PTC element in electrical circuit protection devices.

The PTC liquid crystalline polymer composition of the invention comprises (a) a polymeric component based on one or more liquid crystalline polymers and (b) a particulate conductive filler component, the conductive filler component being dispersed or otherwise incorporated in the polymeric component to form conductive chains in the polymer for current conduction under normal temperatures and current conditions.

Liquid crystalline polymers suitable for use in the invention include thermotropic (thermally activated mesophases) liquid crystalline polymers which are melt processable, and lyotropic (solvent activated mesophases) liquid crystalline polymers, although thermotropic liquid crystalline polymers are preferred. Such thermotropic liquid crystalline polymers are characterized by having an unusually high degree of crystallinity and long range order in its mesomorphic state occurring within certain temperature ranges, which imparts a high degree of PTC behavior upon dispersal of particulate conductive fillers in the polymer. Thermotropic liquid crystalline polymers have a unique combination of properties: excellent mechanical properties, very low melt viscosities compared to other engineering plastics for high processability, excellent electrical properties, high solvent resistance, high continuous use temperature, excellent dimensional stability (very low mold shrinkage and low coefficient of thermal expansion), high flame retardance, low gas and liquid permeability, and low moisture adsorption.

Suitable liquid crystalline polymers for use as the polymeric component of the PTC polymer composition can include liquid crystal polymers in the chemical families of (1) aromatic polyesters, (2) aromatic copolyesters, (3) aromatic copolyester amides, (4) aromatic polyamides, and (5) aromatic polyazomethines and blends thereof. Illustrative examples of suitable aromatic polyester liquid crystalline polymers include, without limitation, poly(p-phenylene terephthalate), poly(p-hydroxybenzoate), and the like. Illustrative examples of suitable aromatic copolyester liquid crystalline polymers include, without limitation, poly(p-hydroxybenzoate-co-2,6-hydroxynaphthoate), poly(decamethyleneterephthaloyldi-p-hydroxybenzoate, poly (ethyleneterephthalate-co-oxybenzoate), and the like. An illustrative example of suitable aromatic copolyester amide liquid crystalline polymers include, without limitation, poly (2,6-hydroxynaphoate-phenoxyaminoterephthoate), and the like. Illustrative examples of suitable aromatic polyamide liquid crystalline polymers include, without limitation, poly (p-phenylene terephthalamide), Kevlar, poly(p-benzamide), poly(2-chloro-1,4-phenylene terephthalamide), poly(p,p'-biphenylamide), poly(2,6-napthalamide), and the like. Illustrative examples of suitable aromatic polyazomethine liquid crystalline polymers include, without limitation, poly(nitro-2-methyl-1,4-phenylenenitriloethylidine-1,4-phenylenethylidine), poly(nitrilo-2-methyl-1,4-phenylenenitrilomethylidine-1,4-phenylenemethylidine), poly(nitrolo-2-chloro-1,4-phenylenenitrilomethylidine-1,4-phenylenemethylidine), and the like. These liquid crystalline polymers can either be prepared by conventional techniques or commercially obtained from industry.

An example of a preferred aromatic copolyester comprising poly(p-hydroxybenzoate-co-2,6-hydroxynaphthoate) that is suitable for use in the invention is sold by Hoechst-Celanese Corporation under the trademark Vectra A950. Such an aromatic copolyester is composed of the esterification product of about 70 mole % hydroxybenzoic acid (HBA) and about 30 mole % 2,6-hydroxynaphthoic acid (HNA) which polymerization can be represented by the chemical reaction shown in Equation (1).

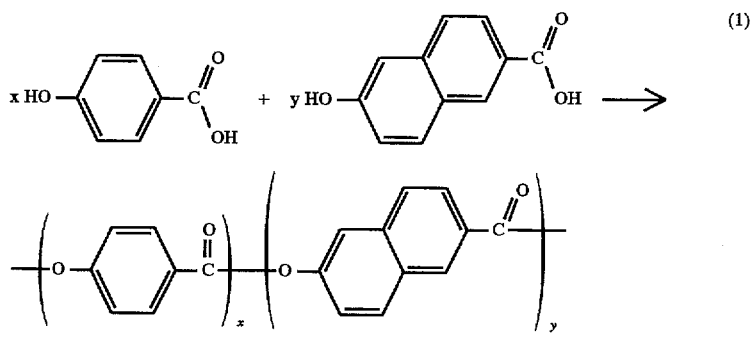

(1)

An example of a preferred aromatic copolyester amide comprising poly(2,6-hydroxy-naphoate-phenoxyaminoterephthoate) that is suitable for use in the invention is sold by Hoechst-Celanese Corporation under the trademark Vectra B950. Such an aromatic copolyester amide is composed of the esterification product of about 58 mole % 2,6-hydroxynaphthoic acid (HNA), about 21 mole % terephthalic acid (TPA), and about 21 mole % 4'-hydroxyacetanilide (HAA) which polymerization can be represented by the chemical reaction shown in Equation (2).

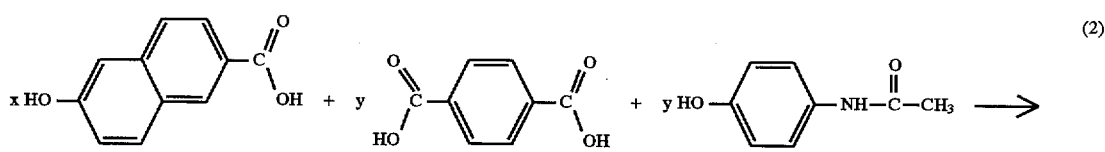

(2)

-continued

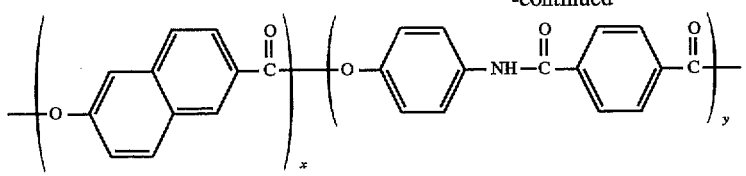

Particulate conductive fillers suitable for use in the invention can include, for example, conductive carbon black, graphite, carbon fibers, metal powders, e.g., nickel, tungsten, iron, copper, etc., or alloy powders, e.g., nichrome, brass, conductive metal salts, and conductive metal oxides, with carbon black, graphite and carbon fibers being preferred. The conductive filler particles are distributed or dispersed in the liquid crystalline polymer matrix, to form conductive chains in the polymer under normal temperature conditions. The conductive particles are dispersed in the polymer matrix preferably in the amount of 5 to 80% by weight, more preferably 10 to 60% by weight, and more preferably about 30 to 55% by weight, based on the weight of the total PTC polymer. The conductive particles preferably have a particle size from about 0.01 to 200 microns, preferably from about 0.02 to 25 microns. The particles can be of any shape, such as flakes, rods, spheroids, etc., preferably spheroids. The amount of conductive particles incorporated into the polymer matrix will depend on the desired resistivity of the PTC conductive polymer composition. In general, greater amounts of conductive particles in the polymer matrix will result in a lower resistivity for a particular polymeric material. Carbon fiber filled liquid crystalline polymers are sold by Hoechst-Celanese under the trademarks Vectra A230 (Blend of 70% Vectra A950 and 30% carbon fiber) and Vectra B230 (Blend of 70% Vectra B950 and 30% carbon fiber).

The composition can also contain non-conductive fillers including arc suppression agents, e.g., alumina trihydrate, radiation cross-linking agents, antioxidants, flame retardants, inorganic fillers, e.g. silica, plasticizers, and other adjuvants.

The PTC liquid crystalline polymer composition of the invention is preferably cured by cross-linking to impart the desired resistance-temperature characteristics to the composition. The PTC liquid crystalline polymer composition is cross-linked preferably by radiation, although chemical cross-linking (i.e., peroxide) is also possible. The radiation source used for irradiation can be a cobalt ($^{60}$Co) source. The radiation curing involves exposing the formed PTC liquid crystalline composition to the source, and can involve a number of passes over the PTC element. Preferably the radiation dose is from about 15 to 800 Mrads, preferably from about 20 to 500 Mrads, more preferably 100 to 300 Mrads, and most preferably about 150 to 250 Mrads. Preferably all effective parts of the PTC element receive a dose within the specified range. The radiation exposure time can be from 30 minutes to 30 days, typically 3 days to 15 days, but preferably 1 day to 3 days or less. It should be understood that a person skilled in the art can use any suitable radiation dosage and exposure time in order to obtain desired PTC behavior. The cross-links formed should be stable in the temperature range in which the PTC composition is required to operate and provide the liquid crystalline polymer with the desired PTC characteristics. Suitable covalent cross-links can include one or more of the linking structures —C—C—, —C—N—, —C—O—, —C—S—C—, C—SO$_2$—, —Si—, —C—CO—, —C—CO—O—, —CONR$_2$— and —CO—S—. Ionic cross-links can also be used. It is also possible that the conductive particles become chemically attached, i.e., grafted, to the liquid crystalline polymer chain by radiation, thereby enhancing and stabilizing the PTC effect. The cross-linking density is that which will achieve the desired resistance/temperature behavior without undesirably compromising the physical properties of the PTC composition.

The PTC liquid crystalline polymer composition of this invention can be prepared by conventional plastic processing techniques such as melt blending the polymeric liquid crystalline component and the particulate conductive filler component, and possible other adjuvants and then molding, e.g., injection or blow molding, or extruding the uncrosslinked polymer, and then cross-linking the polymer to form a molded PTC mass.

In general, while the theory is not completely understood, it is believed that liquid crystalline polymers are desirable polymers for PTC polymers due to, among others, the following fundamental characteristics:

1. The long-range orientational order is preserved in the liquid crystalline phase which makes these materials anisotropic like crystalline solids. Polymers that form the anisotropic molten phase have the property that the polymer chains are regularly oriented in parallel with one another when it is in the molten state. This is a desirable property to improve alignment of the conducting particles, i.e., the conducting chains, for improved electrical properties.

2. The low melt viscosity of thermotropic liquid crystalline polymers is a desirable property for compounding these polymers with higher loadings of conductive fillers to develop PTC polymers for lower electrical resistivities.

3. The higher melting/transition temperature of the liquid crystalline polymers is desirable for both temperature stability and high energy absorption capability for high current applications.

Moreover, it is also believed that cross-linking of the PTC conductive polymer, which comprises (a) liquid crystalline polymers and homogeneously dispersed therein (b) conductive particles, provides for the formation of supplemental covalent bonds between the free radicals of the polymer and the chemical functional groups of the conductive particles, e.g., carbon black. Such cross-linking tends to improve the PTC intensity and electrical reproducibility, especially for thermal cycling stability. Cross-linking can also improve thermaloxidative stability of the polymer as a result of binding the polymer free radicals with, for instance, carbon black, which in the absence of such bonding are chemical sites that are susceptible to oxygen. The cross-linking also tends to reduce the polymer viscosity at the melt temperature.

Furthermore, the relatively strong attachment developed between the conductive particles and the cross-linked network tends to reduce the freedom of movement of the conductive particles at high temperatures including in the melting region. This restricting function of the cross-linked network coupled with the long-range crystalline order of the polymer not only makes the conductive particles redistribute during the movement and thermal expansion of the polymer, but also tends to take the particles reproducibly back to their original positions while the material is cooled to regenerate the conductive path having close to its original resistivity. Lastly, cross-linking of the liquid crystalline polymer tends to decrease any NTC effect at the melting region.

Figure 2:
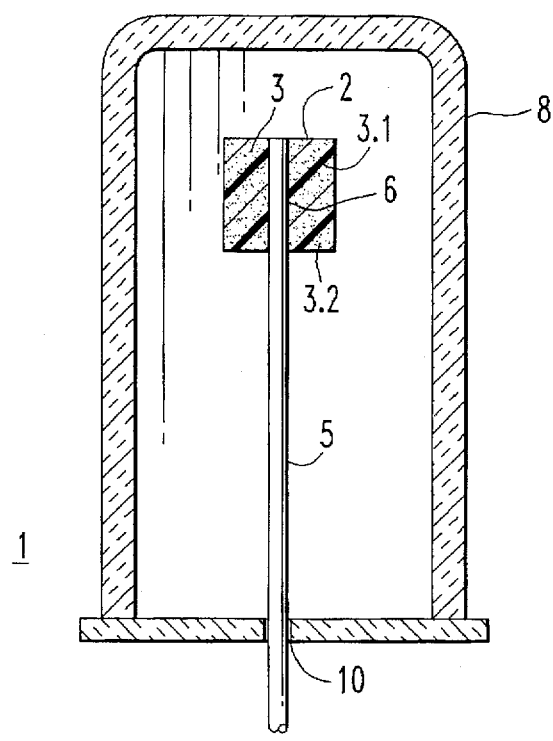
FIG. 2 is a side cross-sectional view on line 2—2 of FIG. 1.
Figure 3:
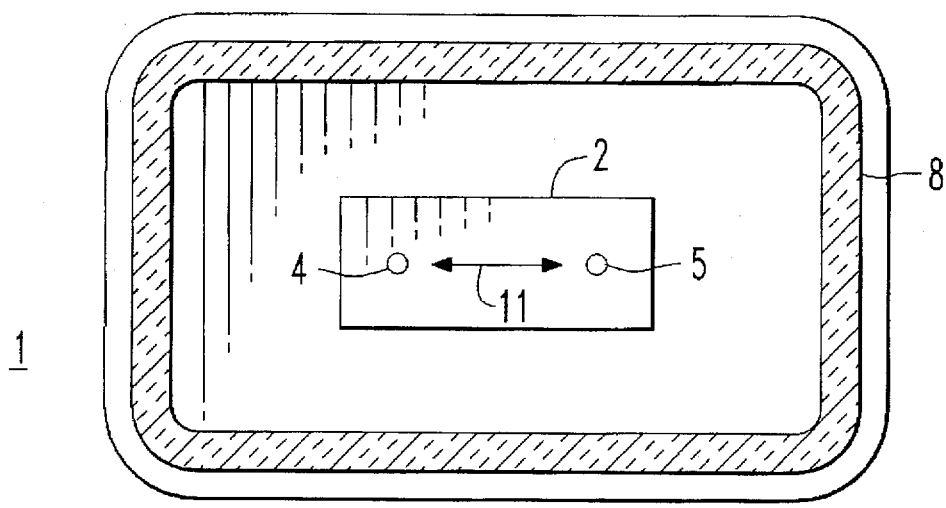
FIG. 3 is a top cross-sectional view on line 3—3 of FIG. 1.

The improved properties of cross-linked PTC liquid crystalline conductive polymer compositions over commercially available cross-linked PTC polyolefin conductive polymers, e.g., polyethylene and polypropylene, among others, are:

higher thermal stability;

higher oxidative stability;

higher mechanical and tensile strength;

higher resiliency and impact strength;

higher radiation stability (minimizing undesirable degradation side reactions during irradiation processing);

longer service life (i.e., more and reproducible PTC thermal trip cycles);

higher current rating;

higher packing density for conductive particles; and, higher order (i.e., more ordered PTC response and more controlled reversible separation of conductive particle chains from higher ordered crystalline polymer backbone); and Referring now to the drawings, FIGS. 1, 2 and 3 show front, side and top views of an electrical circuit protection device of the invention, which comprises a PTC element based on cross-linked liquid crystalline polymers having conductive particles dispersed therein. As shown in the FIGS. 1, 2 and 3, the circuit protection device (1) comprises a PTC element (2) composed of cross-linked liquid crystalline conductive polymer composition (3) which exhibits PTC behavior. The PTC conductive polymer (3) used in the device comprises (a) a polymeric matrix component (3.1) comprising a liquid crystalline polymer, and dispersed in the polymeric component, (b) a particulate conductive filler (3.2).

The circuit protection device (1) further comprises two longitudinally extending, preferably parallel, electrodes (4) and (5) separated by a distance which are each electrically connected at one portion (6), preferably in direct physical contact, e.g., embedded, in the PTC conductive polymer, to the PTC element and which are each electrically connectable at another portion (7) to a circuit having a source of electrical power to cause a current (I) to pass through the PTC element (2). The electrodes are generally made of metal, typically in the form of wire or braids, and preferably are substantially identical. The first portions (6) of the electrodes can be any suitable configuration, such as planar electrodes which are contacted by the PTC element only on one surface, or columnar electrodes which are either surrounded by or surround the PTC element. It should be understood that a person of skill in the art can provide the PTC element and electrode subassembly in any suitable configuration.

The device (1) can also comprise an outer housing (8) for the PTC element which contains two exit ports (9) and (10) through each of which passes the second portion (7) of the two electrodes. The housing can be made of electrical and thermal insulating material. The axis of expansion of the PTC element upon self-heating above its switching temperature, $T_s$, is shown as line (11). Such a circuit protection device (1) can be made by extruding or molding the molten uncross-linked PTC conductive polymer composition (3) over an end of the electrode (4) and (5) and cross-linking the PTC composition with radiation while it is in contact with the electrode.

Figure 4:
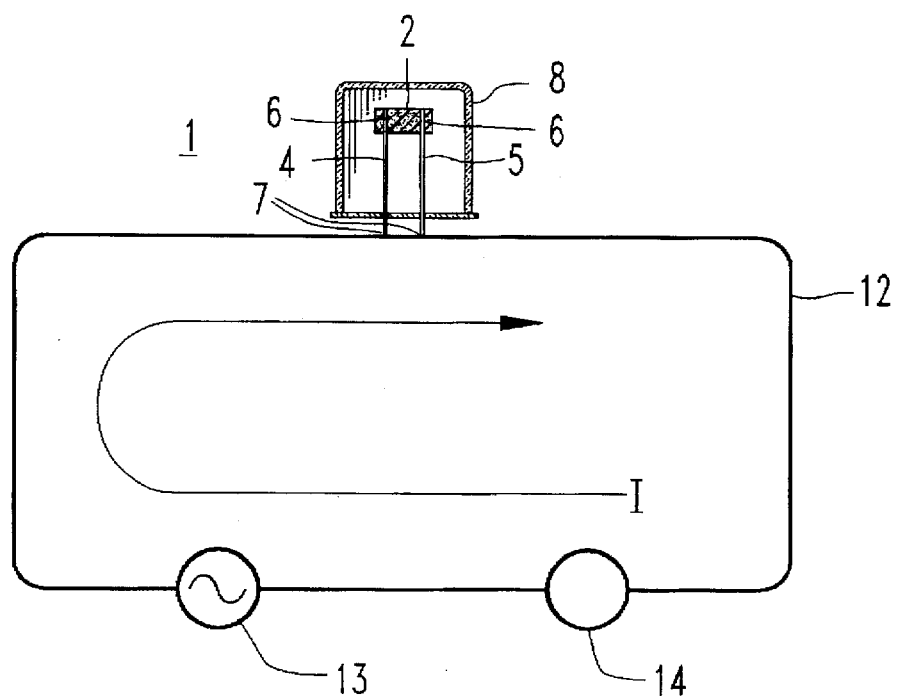
FIG. 4 is an electrical circuit of the invention which includes a circuit protection device of FIG. 1 connected in series with a load and power source.

Referring again to the drawings, FIG. 4 shows a circuit (12) of the invention which comprises a power supply (13), a load (14), and a circuit protection device (1) which comprises a PTC element (2) composed of two electrodes (4) and (5) in electrical contact at a first portion (6) with a PTC conductive polymer (3) based on a liquid crystalline polymer and conductive particles distributed therein and at a second portion (7) with the circuit. The PTC element is typically connected in series with the power source and load. The power source can be a low voltage (600 volts AC or less) or high voltage (600 volts AC or more) power source depending on the temperature-resistance characteristics of the PTC conductive polymer composition. Preferred devices of the invention are liable at fault voltages of 100 to 500 volts AC and have a survival life of at least 100 thermal cycles, preferably at least 500 thermal cycles.

As mentioned above, the PTC composition of this invention generally exhibit anomalous PTC characteristics, that is, they undergo a sharp change in resistivity as the temperature is increased above a certain critical temperature. This very rapid and very large change in resistivity makes the compositions useful in current limiting devices. At normal operating temperatures, the conductive particles form conductive links or chains in the liquid crystalline polymer of the PTC element in the device.

When the temperature of such device rises above the switching temperature, $T_s$, during a fault condition, the resistivity of the composition rapidly increases and reduces the current through the device. As the temperature rises through the PTC element to near and through the polymer melting point, the polymer volume increases rapidly, decreasing the conductive particle to polymer volume ratio. The change in volume through expansion of the polymer breaks or interrupts many conductive chains, causing a several-fold increase in the device resistance, thereby abruptly reducing the current to a safe value. The temperature of the device might rise above the switching temperature due to excessive current-generated resistive heating or by an increase in ambient temperature. After the fault is corrected and the device is allowed to cool down, the device automatically returns back to low resistance, since the PTC conductive polymer is once again formed with conductive links.

A typical resistivity of the PTC device is less than about 1 ohm-cm at about 20° C. or ambient temperature. A typical operating temperature range for the PTC device is between about −40° and 120° C. The transition temperature is typically greater than about 150° C. and the response time is typically less than about 100 msec. The PTC device is preferably rated for greater than about 100 amps continuous current and preferably has a nominal operating voltage of greater than about 500 volts AC. The maximum fault current for the PTC device is preferably around 600 KA.

PTC current limiting devices of the invention can be used for protecting motors, solenoids, telephone lines and batteries. These devices can be used like fuses or circuit breakers but have the advantage of not requiring replacement or manual reset after a fault condition, since they are automatically resettable. Moreover, the PTC devices can be used in conjunction with breakers and contactors, for instance, in series, for enhanced circuit protection.

The invention will now be illustrated by the following Examples, which are intended to be purely exemplary and not limiting.

EXAMPLE 1

A one-eighth inch thick carbon fiber filled liquid crystalline polymer sold by Hoechst-Celanese Corporation under the trademark Vectra A230, which is a blend of about 70% Vectra A950 (poly(p-hydroxy-benzoate-co-2,6-hydroxynaphthoate)) and about 30% carbon fiber, was irradiated with a radiation dose of 150 Mrads using a $^{60}$Co radiation source for about 7 days. The cross-linked liquid crystalline polymer was then tested for PTC response of resistance with temperature during thermal cycling between about room temperature and 180° C. The cross-linked carbon-filled poly(p-hydroxy-benzoate-co-2,6-hydroxynaphthoate liquid crystalline polymer showed a PTC effect without significant change in resistance with each thermal cycle. Then, the liquid crystalline polymer was further irradiated with a radiation dose of 265 Mrads using a $^{60}$Co radiation source for an additional 7 days. The cross-linked polymer was again tested for PTC behavior. The further irradiation did not significantly enhance the magnitude of the PTC effect.

It was found that irradiation increased the resistivity of the polymer and altered the resistance-temperature behavior. Irradiation also increased the electrical stability of the polymer during thermal cycling, such that the polymer can be exposed to repeated trips.

This invention disclosure incorporates by reference herein all of the U.S. patents and publications mentioned above in their entireties.

The invention having been disclosed in connection with the foregoing embodiments and examples, additional embodiments will now be apparent to persons skilled in the art. The invention is not intended to be limited to the embodiments and examples specifically mentioned, and accordingly reference should be made to the appended claims rather than the foregoing discussion, to assess the spirit and scope of the invention in which exclusive rights are claimed.

What is claimed is:

1. An electrical circuit protection device, which comprises:

(a) a PTC element comprised of a cross-linked conductive polymer composition which exhibits PTC behavior, in which the cross-linked conductive polymer comprises a polymeric component of a liquid crystalline polymer of poly(p-hydroxybenzoate-co-2,6-hydroxynaphthoate) and, distributed in the polymeric component, a particulate conductive filler;

(b) two elongated electrodes which are electrically connected at a first portion to the PTC element and which are electrically connectable at a second portion to a source of electrical power to cause current to pass through the PTC element.

2. The device of claim 1, in which the first portion of each of the two electrodes is in physical contact with the PTC element.

3. The device of claim 1, in which the electrodes are spaced apart and longitudinally extend parallel to each other and are embedded at the first portions in the PTC element.

4. The device of claim 1, in which the electrodes are a single piece of solid metal.

5. The device of claim 1, in which the particulate conductive filler is selected from the group consisting of conductive carbon black, graphite, carbon fibers, metals, alloys, metal salts, and metal oxides.

6. The device of claim 1, in which the particulate conductive filler comprises carbon black.

7. The device of claim 1, which further comprises:

(c) a rigid outer housing surrounding the PTC element and electrodes which housing is spaced apart from the PTC element and which contains two exit ports through each of which passes one of the two electrodes.

8. The device of claim 1, in which the PTC element has a resistivity at room temperature of less than 1 ohm-cm.

9. The device of claim 1, in which the PTC element is cross-linked by radiation.

10. The device of claim 1, in which the PTC element is cross-linked at a radiation dose of between about 15 and 800 Mrads.

11. The device of claim 1, in which the particulate conductive filler is dispersed in the polymeric component in an amount from 10 to 60% by weight based on the total PTC element.

12. An electrical circuit, which comprises:

(a) a power source having a voltage V;

(b) an electrical load; and, (c) an electrical circuit protection device, which comprises a PTC element comprised of one or more cross-linked conductive polymer compositions which exhibit PTC behavior in which the one or more cross-linked conductive polymer comprises a polymeric component comprising a liquid crystalline polymer of poly(p-hydroxybenzoate-co-2,6-hydroxynaphthoate, and, distributed in the polymeric component, a particulate conductive filler, and two elongated electrodes which are electrically connected at a first portion to the PTC element and which are electrically connected at a second portion in series to the load and the power source to cause current to pass through the PTC element, so that, if an external power source is introduced into the circuit and increases the current through the circuit protection device above a predetermined fault level, the PTC element self-heats to a switching temperature and expands along an axis of expansion to limit the current passing therethrough to a safe valve.

13. The circuit of claim 12, in which the electrical circuit protection device is liable to faults of about 600 volts AC or greater.

14. The circuit of claim 12, in which the particulate conductive filler is selected from the group consisting of conductive carbon black, graphite, carbon fibers, metals, alloys, metal salts, and metal oxides.

* * * * *